July 4, 1961
J. C. BUSQUET
2,990,791
FURNACES
Filed March 17, 1958
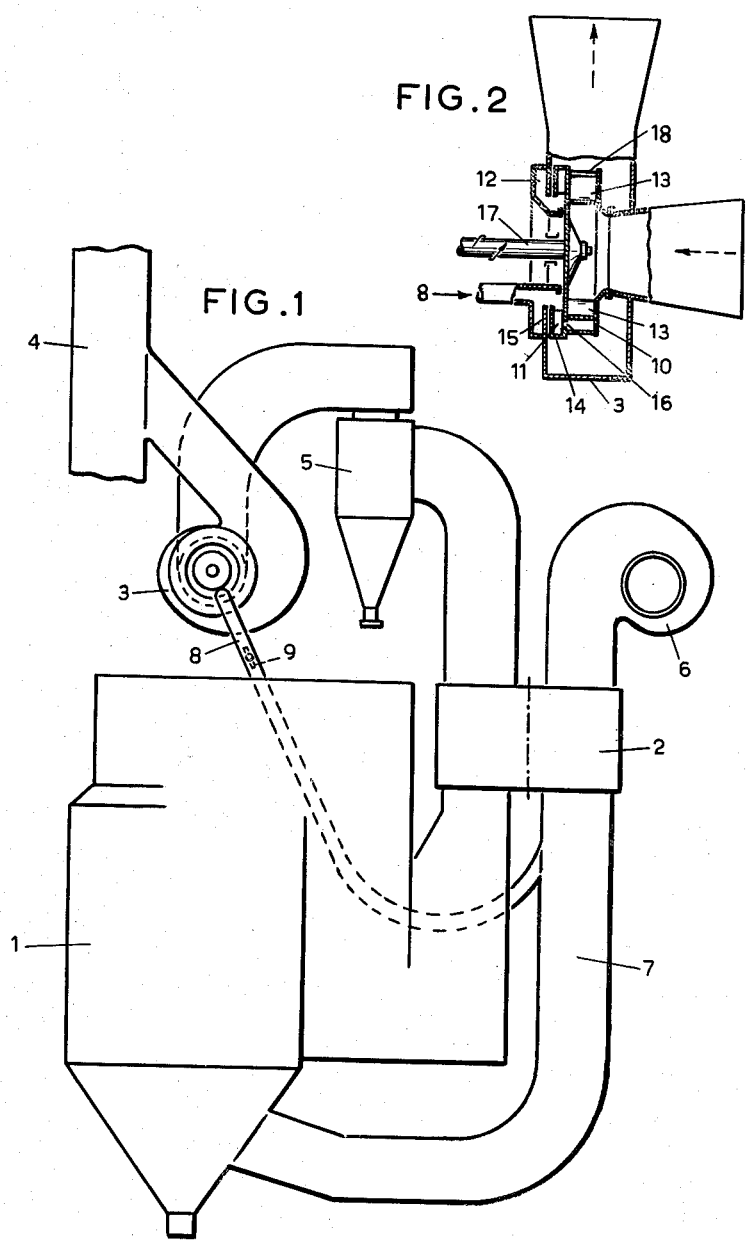
INVENTOR
JAN C. BUSQUET
BY

2,990,791
FURNACES
Jan C. Busquet, Hengelo, Netherlands, assignor to Koninklijke Machinefabriek Gebr. Stork & Co. N.V., Hengelo, Netherlands
Filed Mar. 17, 1958, Ser. No. 721,749
3 Claims. (Cl. 110—162)

This invention relates to a furnace, which for instance may constitute a part of a steam generator plant and is provided with a heater for the air of combustion, in which the air is heated by flue gases from the furnace, a fan being provided for drawing the flue gases through the heater and having hollow impeller blades provided with one or more discharge openings for a pressure fluid entering the interior of the blades. In order to enable said fluid to flow out of the blades the pressure of the fluid must exceed that reigning at the circumference of the impeller.

If cold air is used for said pressure fluid the difficulty occurs that vapours are condensed from the flue gases and the condensate will attack the impeller and the walls of the casing of the fan.

The invention has for its object to remove said drawback and according to the invention a conduit is branched off from the air conduit between the air heater and the furnace, said branched off conduit communicating with the cavity of the impeller blades of the fan. As the air is heated in the air heater to a temperature of 200° C. to 300° C. and the temperature of the flue gases behind the air heater is about 140° C. the vapours contained in the flue gases will not be cooled down below the dew point in the fan.

In the accompanying drawing, which illustrates an embodiment of the furnace according to the invention, FIG. 1 is a diagrammatical elevation of a steam generator plant.

FIG. 2 is a longitudinal section of the fan for the flue gases.

The flue gases discharged from the boiler 1, flow through a heater 2 for the air of combustion after being already cooled in a steam superheater or a feeding water preheater if desired. Said flow of the flue gases is promoted by a fan 3 connected to a flue 4.

A dust separator 5 is arranged between the air heater 2, which may be of the rotary type, and the flue gas fan 3. The air of combustion is supplied by a fan 6 and after having been passed through the heater 2 flows through a conduit 7 to the furnace of the boiler 1. A conduit 8 is branched off from the conduit 7 behind the heater 2, said branched off conduit 8 being connected to the fan 3 and communicates with the cavities of the impeller blades of said fan. Said branched off conduit 8 contains a control valve 9, by means of which the quantity of hot air introduced into the cavities of the blades may be varied.

As shown in FIG. 2, the impeller of the fan 3 may be provided with auxiliary blades 11 at its outer side, said blades at their outer ends being enclosed by a wall 14 and the side wall of the impeller body 10 at the hollow blades 13 being provided with holes 16. The inlet of the auxiliary blades 11 is connected to an annular chest 12 located at the side wall 15 of the fan casing and having a connection for the air conduit 8. With said arrangement the pressure of the air supplied by conduit 8 is increased by the blades 11 and the air with said increased pressure flows into the hollow impeller blades 13 and is discharged through the opening in the wall of said blades. Said arrangement of a flue gas fan with auxiliary blades at the impeller may be used when the fan is immediately connected to the air heater and, therefore, delivers gas with a higher pressure.

What I claim is:

1. In a fuel combustion plant, a furnace having a combustion chamber, a heat exchanger having a first passage for hot flue gases and a second passage in communication with a cool air source for heating the cool air passing therethrough, a fan of the type having a rotatable impeller including hollow blades formed with discharge openings in the walls thereof and means for supplying air to the interior of said blades at a pressure greater than that reigning at the periphery of the impeller, a flue directing hot flue gases away from the combustion chamber and through said first passage, a first conduit directing the heated air from said second passage to said combustion chamber, a second conduit directing the flue gases from said first passage to the fan for expediting removal of the flue gases from the combustion chamber, and a by-pass conduit in communication with the first conduit and the air supplying means of the fan for directing heated air from the heat exchanger through said blades.

2. A fuel combustion plant comprising, in combination, a furnace having a combustion chamber, a heat exchanger having a first passage for hot flue gases and a second passage in communication with a cool air source for heating the cool air passing therethrough, and a fan of the type having a rotatable impeller including hollow blades formed with discharge openings in the walls thereof which are to be provided with air at a pressure greater than that reigning at the periphery of the impeller, a flue directing hot flue gases away from the combustion chamber and through said first passage, a first conduit directing the heated air from said second passage to said combustion chamber, a second conduit directing the flue gases from said first passage to the fan for expediting removal of the flue gases from the combustion chamber, a by-pass conduit in communication with the first conduit and the interiors of the hollow impeller blades for directing heated air from the heat exchanger directly through said blades, and means disposed between said by-pass conduit and the hollow impeller blades for increasing the pressure of the heated air passing therethrough to be greater than that reigning at the periphery of the impeller.

3. A fuel combustion plant comprising, in combination, a furnace having a combustion chamber, a heat exchanger having a first passage for hot flue gases and a second passage in communication with a cool air source for heating the cool air passing therethrough, and a fan of the type having a rotatable impeller including hollow blades formed with discharge openings in the walls thereof which are to be provided with air at a pressure greater than that reigning at the periphery of the impeller, a flue directing hot flue gases away from the combustion chamber and through said first passage, a first conduit directing the heated air from said second passage to said combustion chamber, a second conduit directing the flue gases from said first passage to the fan for expediting removal of the flue gases from the combustion chamber, said impeller having a side wall, a compartment connected to said impeller on the opposite side of said side wall from the hollow blades, said compartment being partially defined by said side wall, auxiliary blades on said side wall for increasing the pressure of air in said compartment to be greater than that reigning at the periphery of the impeller, said side wall having apertures formed therethrough in communication with the interiors of said hollow blades, and a by-pass conduit in communication with the first conduit and the compartment for directing heated air from the heat exchanger directly through said blades.

References Cited in the file of this patent
UNITED STATES PATENTS

| | | |
|---|---|---|
| 871,541 | Wallace | Nov. 19, 1907 |
| 1,076,142 | Mellin | Oct. 21, 1913 |
| 1,773,870 | Schmidt | Aug. 26, 1930 |
| 1,928,822 | Schmidt | Oct. 3, 1933 |

FOREIGN PATENTS

| | | |
|---|---|---|
| 758,906 | Great Britain | Oct. 10, 1956 |